UNITED STATES PATENT OFFICE.

MAXIMILIAN TOCH, OF NEW YORK, N. Y., ASSIGNOR OF ONE-HALF TO HENRY M. TOCH, OF NEW YORK, N. Y.

WATERPROOF PORTLAND CEMENT AND PROCESS OF MAKING IT.

1,029,643.     Specification of Letters Patent.     Patented June 18, 1912.

No Drawing.     Application filed September 21, 1911. Serial No. 650,546.

*To all whom it may concern:*

Be it known that I, MAXIMILIAN TOCH, a citizen of the United States, residing at New York, in the county of New York and State of New York, have invented certain new and useful Improvements in Waterproof Portland Cement and Processes of Making It, of which the following is a specification.

According to this invention finely-divided absorptive aluminum silicate impregnated with a water-insoluble organic-acid amid or ammonia compound is admixed in small proportion with Portland cement, enabling the cement to be used for the production of concrete structures which are impermeable to water, even under high pressure.

When monocarboxylic acids or their glycerids, fatty acids, fats and oils, are subjected to the action of anhydrous ammonia, they react with the ammonia to produce amids or ammonia compounds of higher melting-point and greater hardness.

In order to utilize these amids for the production of waterproof cement, I preferably employ as a carrier one of the highly-absorptive finely-divided aluminum silicates which occur in nature as clays or kaolins, for example fullers' earth or Bohemian terre verte. An aluminum silicate of proper absorptive quality will take up a one-percent. solution of the anilin dye known as malachite green. In carrying out the invention, I saturate the aluminum silicate with from eight to twelve percent. of the organic acid or glycerid, for example with lard oil, cotton-seed oil or linseed oil, and subject the mixture to the fumes of anhydrous ammonia. The conversion into an amid can be more rapidly effected under pressure, as in an autoclave, but in practice it is sufficient to thoroughly agitate the materials in a mixer or tumbling-barrel. Any free fatty acid which is not combined with ammonia is then neutralized with hydrated lime. I have found that from one and one-half to three percent. of the amid-impregnated aluminum silicate is a suitable amount to add to commercial Portland cement to give it waterproof qualities, this proportion not interfering with its setting.

I claim:

1. Waterproof cement, containing a water-insoluble organic ammonia compound.

2. Waterproof cement, containing a water-insoluble fatty-acid amid.

3. Waterproof cement, containing a water-insoluble fatty-acid amid and a finely-divided mineral carrier therefor.

4. Waterproof cement, containing a water-insoluble fatty-acid amid and a finely-divided aluminum silicate carrier therefor.

5. An ingredient for waterproofing cement, comprising a fatty-acid amid and a finely-divided mineral carrier therefor.

6. An ingredient for waterproofing cement, comprising a fatty-acid amid and a finely-divided aluminum silicate carrier therefor.

7. The process of producing a material for waterproofing cement, which consists in impregnating a finely-divided mineral carrier with an organic acid ammonia compound.

8. The process of producing a material for waterproofing cement, which consists in impregnating finely-divided aluminum silicate with a fatty-acid amid.

9. The process of producing a material for waterprofing cement, which consists in impregnating highly-absorptive finely-divided aluminum silicate with a monocarboxylic acid or its glycerid, and reacting thereon with ammonia.

10. The process of producing a material for waterproofing cement, which consists in impregnating highly-absorptive finely-divided aluminum silicate with a monocarboxylic acid or its glycerid, reacting thereon with ammonia, and neutralizing any uncombined fatty acid.

In testimony whereof I affix my signature in presence of two witnesses.

MAXIMILIAN TOCH.

Witnesses:
HARRY E. BAER,
ARCHIBALD C. REID.

Copies of this patent may be obtained for five cents each, by addressing the "Commissioner of Patents, Washington, D. C."